United States Patent

[11] 3,596,549

| [72] | Inventor | Katsuji Miyazaki<br>111, Eifuku-cho, Suginami-ku, Tokyo, Japan |
|---|---|---|
| [21] | Appl. No. | 827,250 |
| [22] | Filed | May 23, 1969 |
| [45] | Patented | Aug. 3, 1971 |
| [32] | Priority | Dec. 14, 1968 |
| [33] | | Japan |
| [31] | | 43/91367 |

[54] CUTTING MACHINE FOR TUBE BEING FED IN A CONTINUOUS LENGTH
11 Claims, 7 Drawing Figs.

[52] U.S. Cl............................................. 83/37,
83/292, 83/301, 83/318, 83/408
[51] Int. Cl......................................... B26d 11/00
[50] Field of Search............................................. 83/292,
301, 404, 408, 318—320, 37—39, 42; 143/46, 47-7

[56] References Cited
UNITED STATES PATENTS

| 2,149,430 | 3/1939 | Fleming................ | 83/292 |
| 2,163,967 | 6/1939 | Strawn et al................ | 83/292 |
| 2,569,878 | 10/1951 | Avinger et al................ | 143/46 X |
| 2,711,006 | 6/1955 | Abbey......................... | 143/47 X |
| 2,582,025 | 1/1952 | Frank et al.................... | 83/158 X |

*Primary Examiner*—James M. Meister
*Attorney*—John Cyril Malloy

ABSTRACT: A machine which provides structure for continuously severing a main length of tubing being fed from a feeder means, such as an extruder, first cutting the advancing tubing into primary lengths, and, then, severing each of the primary lengths into a plurality of relatively short lengths. The machine includes a first reciprocally moving cutting station with support and guide means for moving it along the path of movement of advance of the tubular material. This station includes a cutter operable while the primary cutting station is moving in parallel and at a similar velocity to that of the advancing tube to cut a primary length from the advancing tube on each advanced stroke of the reciprocating primary cutter. The cutting machine also includes conveyor means and a secondary station for cutting each of the primary lengths into a plurality of relatively short secondary lengths which are the product of the machine.

INVENTOR.
KATSUJI MIYAZAKI
BY
John Cyril Malloy
ATTORNEY

CUTTING MACHINE FOR TUBE BEING FED IN A CONTINUOUS LENGTH

This invention relates to an apparatus and process for continuously severing a main length of tubing being fed from a feeder means into primary lengths first and, then, severing the primary lengths into a plurality of secondary lengths. As is perhaps well known, tubing is often formed as by an extruder in long main length of such a length as to be substantially continuous. This machine has as an object the provision of an apparatus and a process for severing from the advancing end of such a main length or continuous length of tubing a primary length which in turn is cut into a plurality of relatively short lengths by two stages, a first stage of cutting the advancing tube into a main length and a second stage of cutting the main length into a plurality of relatively short lengths.

It is, accordingly, an object of this invention to provide an improved automatic machine and process for cutting a continuously advancing length of tubing into a plurality of relatively short lengths of tubing.

In accordance with these and other objects which will become apparent hereinafter the instant invention will now be described with reference to the accompanying drawings in which.

Figure 1:
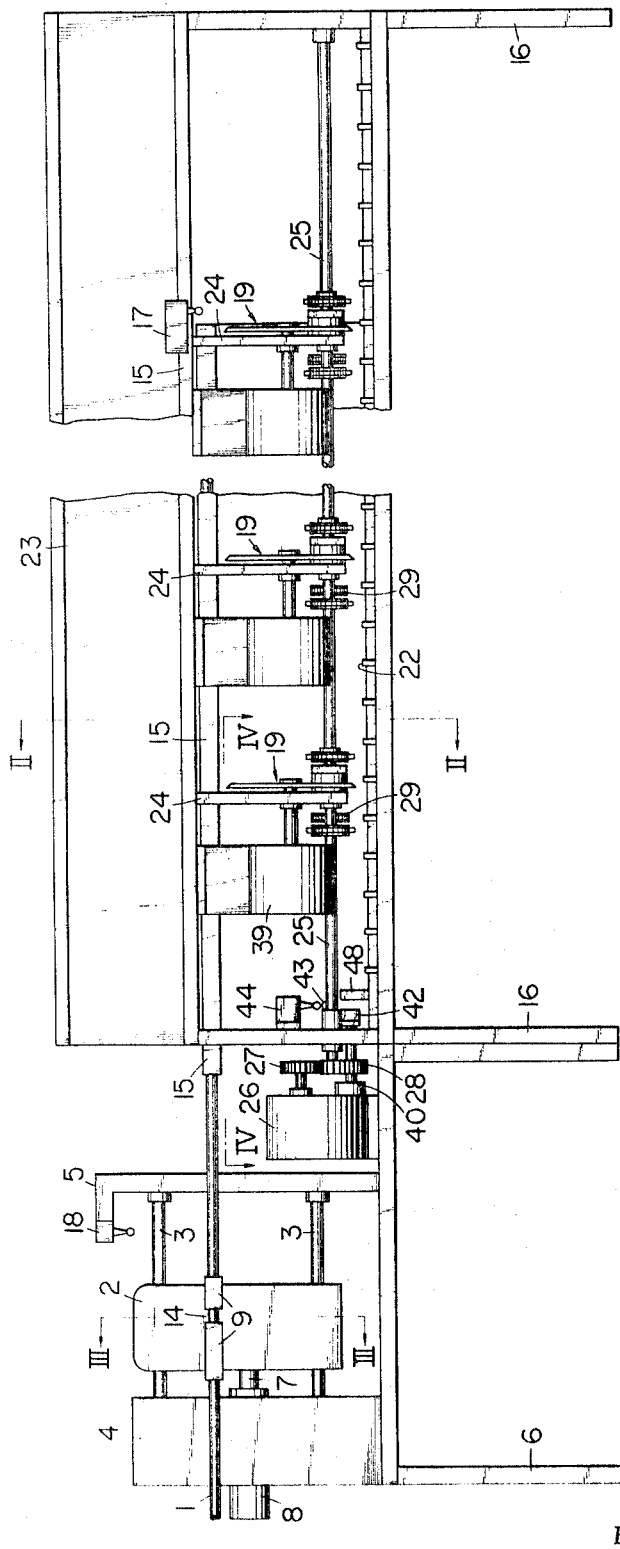
FIG. 1 is a front elevation view of the machine.
Figure 4:
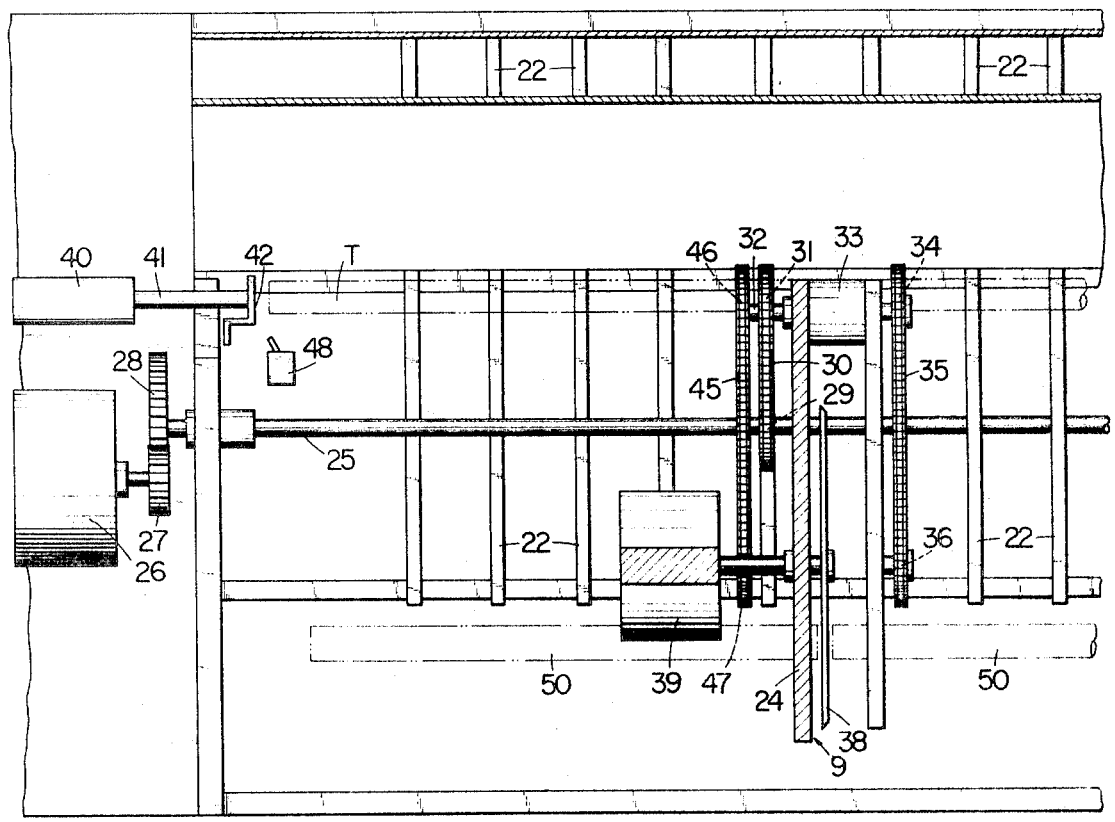

FIG. 4 to an enlarged top plan view taken in transverse section along the line IV–IV of FIG. 1; and FIGS. 5A to 5C are schematic views illustrating the sequence of intermittent conveyance of long lengths of tubing by feed chains.

Figure 3:
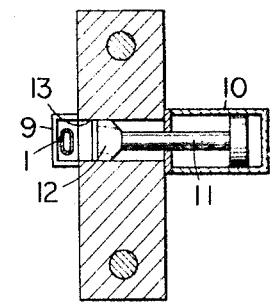
FIG. 3 is an enlarged vertical sectional view taken along the line III–III of FIG. 1.

Initially, it will be helpful in understanding the following description to describe the operation or process generally. A long or main length of tube 1, so long as to be continuous for purposes of this discussion, is fed from a feeder, preferably from an extruder into the cutting machine of the instant invention, there to be severed on passing through two successive stations into shorter lengths. To this end, two cutting stations are provided: first, a primary cutting station, which is a moving station, is provided. At this station a single blade, which is seen in FIG. 3, is arranged to cut the advancing tubing into relatively long tubes of a first length or, as described herein, cyclically into elongated pieces or tubes of a common length. Then, after movement by a conveyor means to a secondary cutting station, each of the elongated or primary pieces is sliced into relatively shorter lengths by a plurality of spaced, rotating blades, the blades being designated by the numeral 38 in FIG. 4. As will now be described, suitable structure and instrumentation is provided for the actuation of the continuous operation of the cutting machine for severing the advancing tubing at the two stations.

Referring to the drawings, a long length of tubing is fed from the tube manufacturing equipment, for instance, the tube being generally designated by the numeral 1. At a first cutting station 2 or a primary cutter or cutting means, the advancing tubing is successively severed into a plurality of relatively long or lengthy pieces. The primary cutter 2 is slidably supported upon an upper and lower horizontal guide rods 3 which extends between two vertical supports 4 and 5 mounted upon a frame 6 and positioned in the front and rear of the cutter. One side of the primary cutter 2 is connected to the front end of a rod 7 of a hydraulic cylinder 8, which is mounted to one of the support 4, so that the cutter may be moved forward by the rod 7 in a direction parallel to the movement of the advancing tube 1 and at a speed equal to or slightly higher than the tube speed so that the blade 12, see FIG. 3, may be driven transversely of the direction of travel of the advancing tube to cut it without interfering with the advancing movement of the tubing, all as will be described hereinafter.

As seen in FIG. 3, the primary cutter 2 is provided with a tube guide assembly 9 of short sleeves or the like through which the tube passes. Intermediate the sleeves of the guide assembly, as shown in FIG. 3, a hydraulic cylinder 10 is arranged to travel a piston rod 11 at right angles to the feed direction of the tube, in such a manner that upon movement of the rod 11 in the cylinder 10 of the blade 12, carrier at the leading edge of the rod, is adapted to cut the tube 1. As seen at the left-hand side of FIG. 1, to permit the forward and backward movements of the piston rod 11, the primary cutter 2 is formed with a through hole 13 crosswise, and a discontinuous section 14 is provided in the tube guide assembly 9.

Figure 2:
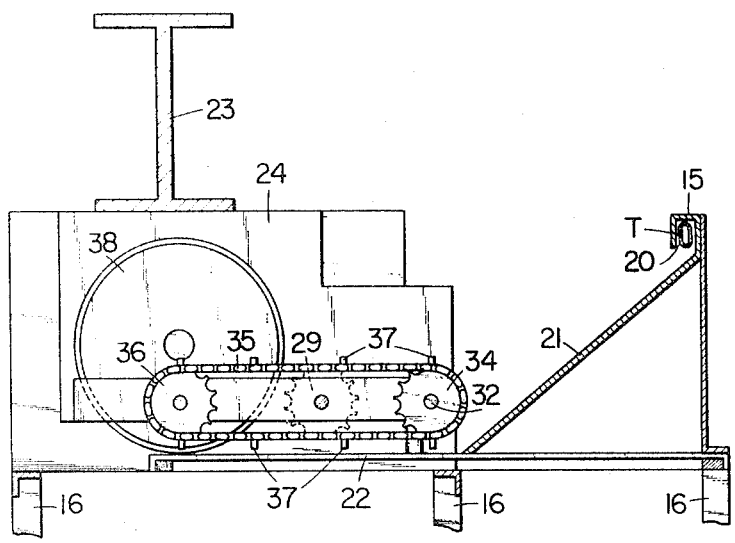
FIG. 2 is an enlarged vertical sectional view taken along the line II–II of FIG. 1.

Before entering the secondary cutting station, the lengthy piece of tubing severed from the advancing tubing is traveled into a elongated guide channel 15, which is seen in FIG. 1, as well as FIG. 2. This guide channel constitutes an inverted U-shaped member arranged in a horizontal attitude over a base frame 16 and receives the tube delivered from the tube guide assembly 9 of the primary cutter station 2. At the forward or front end of this guide channel, right-hand side of FIG. 1, there is provided a limit switch 17, which is arranged in the path of the advancing tube and is actuated by the end of the length that has passed through the guide channel 15, in such a way that, by the actuation of this switch, the hydraulic cylinder 8 for the primary cutter station 2 is operated to move the primary cutter forwardly in the direction of the advancing tubing substantially synchronously, that is, at a substantially common linear velocity with the advance of the tube 1. Simultaneously, the cylinder 10 for the blade 12 is also energized to drive the rod 11 forward to cut the simultaneously moving tube into the primary lengths of lengthy pieces of tubing.

After the above-described operation at the first cutting station which it is seen is in effect a moving cutting station, the advancing primary cutter 2 actuates a limit switch 18 which is arranged in its path of travel and carried, preferably, to the front supporter 5. This switch operates the valves of both of the hydraulic cylinders, the hydraulic cylinder 8 which effects the movement of the primary cutter station and the cylinder 10 which controls the operation of the cutter 12. Accordingly, the piston rods of these two cylinders are urged back or withdrawn to their original positions, and the primary cutter 2 or cutting station retracts to the left as seen in FIG. 1, and the blade 12 is quickly withdrawn from the path of travel of the tube.

At the second cutting station, which in the embodiment shown is beneath the guide 15 and is designated by the numeral 19 in FIG. 1, secondary cutters are arranged for cutting each of the pieces of tube T produced by the primary cutter 2 into shorter pieces. As shown, these cutters are mounted on the frame 16 and arranged at spaced intervals preferably in the direction of advancement of the tubing from the primary cutting station.

A long piece that is a primary length of tube T fed from the primary cutter 2 through the guide channel 15 drops from the open bottom or lower opening 20 and slides downwardly over a slanted feed plate 21 or preliminary feed and positioning means onto a continuous conveying platform surface 22 associated with which a conveyor means having feed fingers, see FIG. 2, which are arranged to separately advance successive lengthy pieces, see FIG. 2, beneath a conveyor chute and into the path of slicing blades 38, as is also indicated in FIG. 5a, 5b and 5c.

In the exemplary embodiment, secondary cutting 19 are constructed as follows: under a common, longitudinal, upper frame 23, there are suspended a plurality of secondary station holders 24 which are spaced at suitable intervals. A drive shaft is supported by these holders 24 and extends longitudinally of the frame. The drive shaft 25 is adapted to be turned through an angle of 180° in each cycle by a one-revolution motor 26 provided with reduction gears 27 and 18.

On the driving shaft 26 and on one side, e.g., left side, of each holder 24, there is keyed or fixed a driving sprocket 29 to drive an endless chain 30 which also engages a sprocket 31 on a driven shaft at each station which is journaled to the same holder 24, so that the rotation of the driving sprocket 29 is transmitted to the driven shaft, designated by the numeral 32. The driven shaft means 32, a portion of which may be located at each station or which may, alternatively be a common shaft, is supported by bearing means 33 at the side of the machine as by the holder 24. Preferably, the shaft means 32 is provided with a pair of sprockets, such as the sprocket 34 in opposite relation of the sprocket 31.

An endless feed chain 35 engages the right sprocket 34 and also engages with a sprocket 36 which is located at the right front of the holder 24. The feed chain 35 or feed means is provided with fingers or protrusions 37 seen in FIG. 2 which are of a common length and are spaced at predetermined intervals along the length thereof to engage the advancing tube pieces for movement of them into the cutting blades for severing into the shorter lengths, as will be described.

Each primary length or piece of tube T from the primary cutter 2 that has dropped from the guide channel 15 and, under the influence of gravity, slid over the slanted chute or plate 21 onto the conveying platform 22 at the rear of the lower path of the feed chain 35 in the manner described, is caught or engaged by one of the engageable protrusions or fingers 37 and is carried forward sidewise, as indicated in FIGS. 5a, 5b and 5c over the conveying platform 22 and into the cutting area.

On one side of each holder 24 there is secured a cutter, as shown, a rotary blade 38, which is adapted to be rotated by a motor 39 fixed, for instance, to the upper frame 23. In such a manner, the rotary blade is adapted to cut the lengthy tube T conveyed by the feed chain 35 into shorter lengths. The motor 26 for the driving shaft 25 is so controlled by a timer so that it begins to operate within a predetermined period of time following each actuation of the limit switch 17 at the front end of the guide channel 17, that is, as each primary length of tube is severed from the advancing tube 1, and drops from the guide channel 15 and onto the conveying platform 22, the motor 22 is energized to drive the shaft 25.

A positioning cylinder 40 is preferably provided to engage one end of the lengthy pieces of tube to be severed into shorter lengths 50, after it has dropped from the guide channel 15, to finalize the positioning of the tube 50 for passage into the path of the rotating blades. More particularly wit reference to FIG. 4, a rod 41, associated with the cylinder protrudes in the direction where the tube 50 advances, so that the front end portion 42 of the rod is adapted to push the cut end of the long tube T dropped from the guide channel 15 onto the platform 22 until the tube T reaches a predetermined position. This positioning means including the cylinder 40 is so arranged that, when the motor 26 for the driving shaft 25 has completed one revolution and the driving shaft 25 has turned at 180° to stop, a sidewise protrusion 43 or cam means of the driving shaft 25 or the rotating shaft of the motor actuates a switch means 44 which in turn opens the valve of the positioning cylinder 40 so that the positioning rod 41 advances to bring the long tube T into position. The rod 41 in the extremity of its movement or stroke actuates a resetting microswitch 48 which is contacted by the portion 42 in the embodiment shown and thereby switches the valve so that it moves back to the original position.

In the preferred embodiment to provide stability for the cutting operation at the secondary cutting station, the rotating blades are provided with feed chains on each side. In other words, each holder 24, for each of the secondary cutting station locations, is provided with another feed chain 45 in engagement with the sprockets 46 and also engaging sprockets 47 on the side opposite to the one where the chain 35 is arranged, see FIG. 4, so that the rotating blades 38 rotate in the medial plane between the two chains 35 and 45. This structure has the advantage of avoiding any deflection or deviation of the long tube T with respect to the rotating blades in the course of cutting into shorter pieces and constitutes a stabilizing means for holding the longer length during the cutting process at the secondary station.

A review of the operation will be helpful at this point. In the embodiment shown, as already stated, a continuous length of tube 1 is fed through the guide assembly 9 of the primary cutter 2 into the guide channel 15 and, as its front end passes alongside the limit switch 17 provided at the forward portion of the channel 15, the switch 17 is actuated. The limit switch 17, when actuated, operates the hydraulic cylinder 8 for the primary cover 2 so that, under the influence of the rod 7, the primary cutter moves or advances simultaneously with the advance of the tube 1. Also by means of the limit switch 17, the rod 11 of the hydraulic cylinder 10 for the tube cutting station causes the cutter blades 12 to cut the tube 1 into the primary lengths. Bearing in mind that the primary cutter station is a moving station, it is seen that as the primary cutter station moves forward it actuates the limit switch 18, which is arranged in its path on the supporter 5 in the embodiment shown. This is to withdraw the rods 7 and 11 of the respective cylinders 8 and 10 to their respective original positions and consequently to withdraw the primary cutter blade and station back along the path of the tube travel to the start position of the next cycle.

Each length of tube thus cut off, or each long length T, is fed into the guide channel 15 and drops by its own weight from the underopening of the channel 15 onto the slanted chute or plate 21, sliding over it and stopping by contact with the rear edges of the engageable protrusions 37 or fingers, see FIG. 5, that have moved upon movement of the feed chain 35. Next, the motor 26 in a preferred embodiment makes one revolution and the driving shaft 25 turns through an angle of 180° so that the feed chains 35 travel a distance equal to one-half of the circumference of the drive sprocket. In this embodiment, the fingers 37A of each chain 35 receives the first length of tube T-1 stops this tube at the rear edge thereof as shown in FIG. 5A. Thereafter, if the chains 35 begin traveling, the protrusion or finger 37A moves forward leaving the long tube T-1 behind and the following protrusion 37B moves into position behind the long tube length T-1. As the motor 26 completes one revolution and stops, a limit switch 44 for the positioning cylinder is cammed or actuated to cause the forward movement of the rod 41 from the positioning 40. Thus the front end 42 of the rod 41 pushes upon the end of the resting tube T-1 unit it has been positioned in the predetermined position for cutting into the second shorter lengths and as the positioning rod 41 reaches the limit of its travel it actuates a return limit switch 48 for retraction thereof.

As to timing, when the continuous length of tube 1 led into the guide channel 15 passes by the limit switch 17 of the guide channel 15 and actuates the same, this is at about the time when the positioning of the preceding length of tube T-1 has been completed by the rod 40 of the positioning cylinder 40. Then, in the manner as already described, the primary cutter 2 cuts off the tube while moving forward and, at the same time, actuates the timer for power supply to the motor 26. The second primary length of piece of tube T-2 thus obtained drops from the guide channel 15 over the slanted plate 21 onto engagement with the rear edges of the second engageable protrusions 37b in the rear part of the lower paths of travel of the feed chains 35. Then, electricity is supplied to the motor 26 by the timer, and the motor 26 makes one revolution to drive the feed chains 35. While the chains travel in this way, the first length of tube T-1 positioned in front of the second engageable protrusions 37b is carried thereby in the direction at right angles to the axial direction of the tube. This time the second length of tube T-2 is left behind.

As the chains 35 stop travelling, the positioning limit switch 44 is actuated and the rod 41 of the positioning cylinder 40 moves forward thereby brining the second length of tube T-2 in position and then recedes. Repeating the same procedure as above described, the tube 1 fed into the guide channel 15 actuates the limit switch 17 for the guide channel 15 for the third cutting operation, and the third length of tube T-3 slides down over the slanted plate 21 onto the rear parts of the feed chains 35. In response to one revolution of the motor 26 the first and second engageable protrusions 37a and 37b of the chains 35 carry forward the preceding first and second tubes T-1 and T-2 respectively, while the third length of tube T-3 is left behind. After the chains 35 have stopped running, this third tube is put in order by the rod 41 of the positioning cylinder 40.

In the manner described the lengthy pieces of tube T-1 cut off in succession by the primary cutter 2 slide down over the slanted plate 21 and are carried forward over the conveying platform 22 by the engageable protrusions 37 of the feed chains which travel intermittently. As each length of tube, e.g., the tube T-1, is conveyed over the platform, it is cut off by the rotating blades 38 at certain intervals into shorter ones 50 of predetermined length, and these short lengths are delivered out in succession.

With the apparatus of the invention, as above described, a continuous length of tube being fed in from a tube manufacturing machine is first cut into lengthy pieces which are further cut into shorter ones, all in automatic and continuous operation. This presents an advantage especially in the manufacture of radiator tubings.

I claim:

1. A cutting machine in combination for successively cutting primary lengths from the advancing end of a continuous main length of tube fed into the cutting machine and, thereafter, for cutting each of the primary lengths into a plurality of shorter lengths comprising:
   A. a frame including
   a first guide means to confine the main length being fed into the machine along a predetermined path of advance from an entrance point to a second point;
   B. a displaceable primary cutting station including
      1. a cutter
      2. means supporting said primary station for movement of said cutter along said path of the tube being cut,
      3. means
         a. to move said cutter reciprocally along said path between limits of travel intermediate said points and at a velocity, when moving in the direction of the advancing tube, which is substantially the same as that of the tube velocity, and
         b. to move said cutter transversely across said predetermined path to sever a primary length from the end of the continuous main length advancing toward the second point on each advancement of said station while said advancement is taking place;
   C. a secondary cutting station downstream of said first cutting station comprising,
      1. a plurality of spaced cutter members of a common cutting orientation, and
      2. means to operate said cutters simultaneously;
   D. a second guide means comprising a downwardly opening channel member whereby severed primary lengths are gravity fed to said secondary cutting station;
   E. conveyor means on said machine, intermediate the length of said secondary cutting station, to move said lengths transversely of said secondary cutting station to be severed by said plurality of cutter members into shorter lengths; and
   F. drive means for said means to move said cutter, said drive means to operate said cutter for automatically cutting from the main length successive primary lengths and, thereafter, for cutting each of the primary lengths into a plurality of shorter lengths.

2. A cutting machine as set forth in claim 1 where the means supporting said primary cutting station includes spaced vertical support means adjacent the entrance point, a horizontal guide rod means intermediate said supports, parallel to the path of said first guide means, means movably connecting said primary cutting station to said guide means, and said means to move includes a hydraulic drive cylinder and a drive piston element operably secured in said cylinder, means supporting said cylinder and piston relative to said primary station with its axis parallel to said path and connection means between the extending piston and said primary station.

3. The cutting machine as set forth in claim 1 wherein, said plurality of cutter members of said secondary cutting station are arranged in alignment with one another, include a timer controlled common drive means and means connecting each of the cutter members to said drive means, limit switch means being provided, in the path of the advancing main length of tube, which is actuated by the advancing end of said main length, operating said primary cutter to move same forwardly in the direction of said advancing main length, simultaneously cutting one primary length therefrom, said timer controlled drive means being operated by said limit switch means for cutting a primary length into a plurality of shorter lengths after said one primary length is gravity fed into said secondary cutting station.

4. The cutting machine as set forth in claim 1 wherein the means supporting said primary cutting station includes spaced vertical supports adjacent said entrance point, a horizontal guide rod means intermediate said supports and parallel to said guide means, and means movably connecting said primary cutting station to said guide rod means.

5. The cutting machine as set forth in claim 4 wherein said means to move includes a hydraulic drive cylinder in a fixed position relative to said primary station and a drive piston element operatively secured in said cylinder, means supporting said cylinder and piston with its axis parallel to said path and means to connect the extending end of the piston to said primary station.

6. The cutting machine as set forth in claim 4 wherein said first guide means and said means to move said cutter includes a tube guide assembly in said primary station including adjacent sleeve elements, a cutter cylinder and cutter piston connnected to said cutter, and means to support the cutter cylinder and cutter piston with the axis thereof perpendicular to said path and intermediate said elements and with the cutter piston extending toward said path, and means to connect the extending cutter piston to said cutter for reciprocable movement across said path.

7. The cutting machine set forth in claim 1 wherein said timing means includes limit switches, and means supporting said switches in the path of movement at said primary station.

8. The cutting machine as set forth in claim 1 wherein said primary cutting station is at a first level and said secondary cutting station is beneath said first level and said conveyor means includes a chute portion to travel the primary lengths to said secondary cutting station.

9. The cutting machine as set forth in claim 8 wherein said conveyor means includes a plurality of interconnected moving finger members interconnecting the lower end of said chute and arranged to travel said primary lengths through said secondary cutting station in a predetermined path.

10. The cutting machine as set forth in claim 1 wherein said cutter members of said secondary cutting station are arranged in alignment with one another and include a common drive means and means connecting each of the cutter members to said drive means.

11. The process of continuously severing an endless main length of tubing being fed from a feeder means first into primary lengths and then continuously severing the primary lengths into secondary lengths, comprising the steps of:
   A. guiding the main length of tubing along a predetermined path;
   B. cyclically (a) moving a primary cutter means reciprocably along the path and at a velocity in the stroke in the direction of advance of the continuous main length which is about the same as that of said advance and (b) successively intermittently transversely cutting a primary length from the advancing end of the main length on each advance stroke;
   C. collecting and orienting the main length in a common elevated attitude at a secondary cutting station including a plurality of spaced cutters;
   D. successively gravity feeding and moving each of the main lengths transversely to the spaced cutters in a common attitude and
   E. cutting the main lengths into shorter lengths by said spaced cutters.